United States Patent

Schutz

[15] 3,643,429
[45] Feb. 22, 1972

[54] GAS GENERATOR CONSTRUCTION

[72] Inventor: Manfred Schutz, Ottobrunn, Germany
[73] Assignee: Messerschmitt-Bolk-Blohm GmbH, Munich, Germany
[22] Filed: Oct. 24, 1969
[21] Appl. No.: 868,997

[30] Foreign Application Priority Data

Nov. 16, 1968    Germany..................P 18 09 348.6

[52] U.S. Cl. ...................60/39.46, 60/39.74 A, 60/258
[51] Int. Cl. .........................................F02k 9/02
[58] Field of Search .................60/39.74, 39.69, 39.65, 258, 60/261, 207, 39.46

[56] References Cited

UNITED STATES PATENTS

| | | | |
|---|---|---|---|
| 2,616,257 | 11/1952 | Mock | 60/39.74 |
| 2,616,258 | 11/1952 | Mock | 60/39.74 |
| 2,638,745 | 5/1953 | Nathan | 60/39.65 |
| 2,960,823 | 11/1960 | Fox | 60/39.71 |
| 3,112,612 | 12/1963 | Adamson | 60/39.74 |
| 3,200,589 | 8/1965 | Mower | 60/39.74 |
| 3,232,048 | 2/1966 | Stockel | 60/261 |
| 3,413,810 | 12/1968 | Kaufmann | 60/39.72 |
| 3,524,319 | 8/1970 | Stockel | 60/259 |

*Primary Examiner*—Douglas Hart
*Attorney*—McGlew and Toren

[57] ABSTRACT

A gas generator construction particularly an auxiliary combustion chamber for a rocket engine of the main current type for the production of oxygen-rich propellant gases of relatively low temperatures includes either a single annular reaction chamber or a plurality of individual side-by-side reaction chambers arranged within an annular combustion chamber which is located to discharge its gases to a rotating turbine. The construction includes means for directing a propellant component in the form of a liquid fuel into the reaction chamber in the form of a spray and for directing the primary oxygen supply through openings surrounding the nozzle for the liquid fuel in order to provide a stoichiometric combustion of the fuel with a part of the oxygen and oxygen carrier in the reaction chamber. The reaction chamber or chambers are of shorter length than the casings for the gas generator and combustion of the fuel with a part of the oxygen supply takes place in the reaction chamber. Secondary oxygen is directed into contact with the walls of the reaction chamber either from the portion of the walls which are located within the auxiliary gas generator or through bores defined along the length of the walls defining the reaction chamber.

5 Claims, 5 Drawing Figures

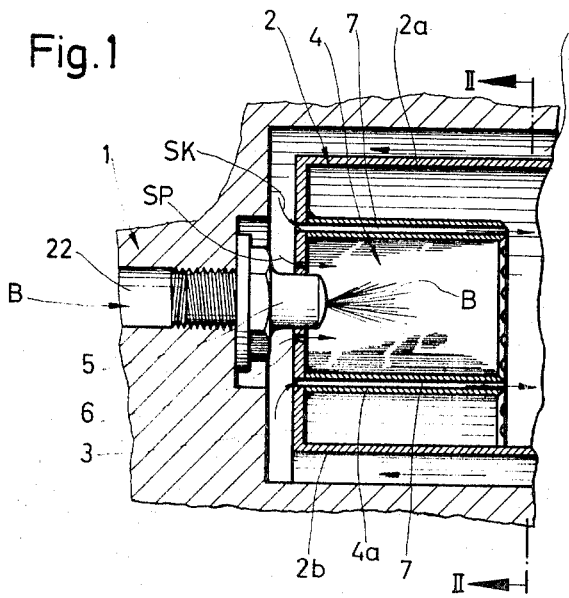
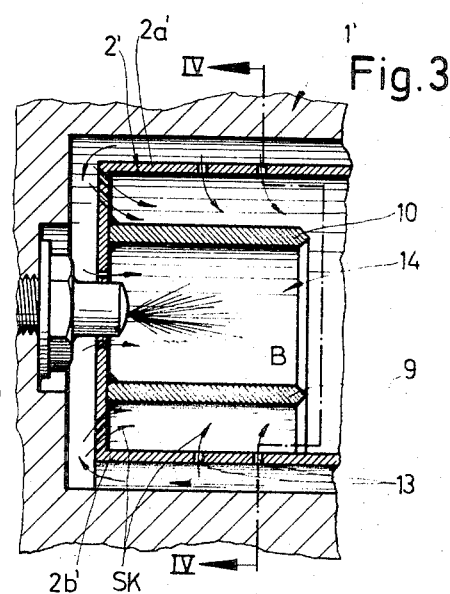
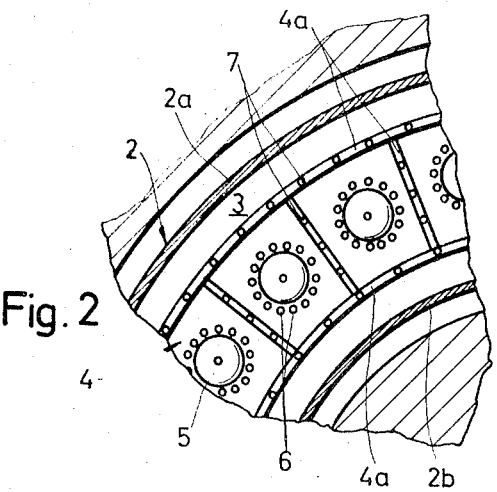
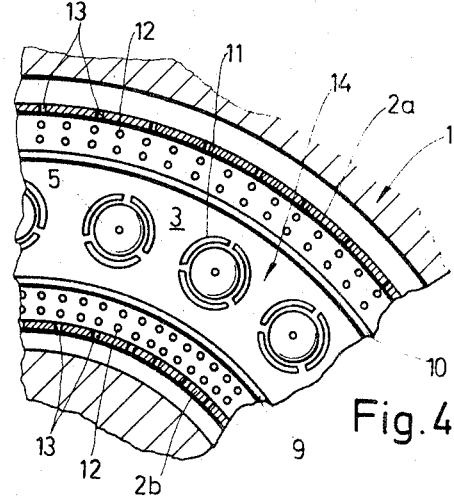
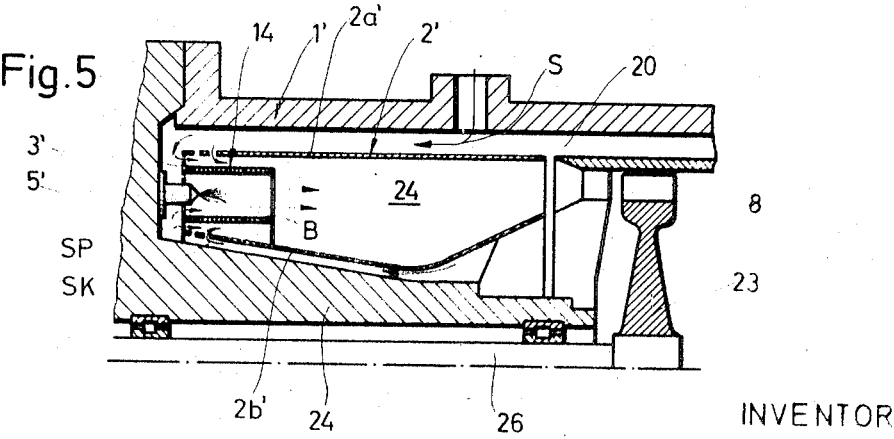
INVENTOR
Manfred Schutz

GAS GENERATOR CONSTRUCTION

SUMMARY OF THE INVENTION

This invention relates in general to the construction of gas generators or combustion chambers, and in particular, to a new and useful auxiliary combustion chamber construction for a rocket engine of the main current type in order to produce oxidizer-rich propellant gases of relatively low temperature and wherein there is a separate stoichiometric combustion of the fuel with a part of the oxygen or oxygen carrier.

In accordance with the U.S. Pat. No. 2,706,887, a rocket engine is known whose combustion chamber comprises an outer combustion chamber housing with an axially adjoining thrust nozzle and an inner flame chamber extending up to the thrust nozzle in which a stoichiometric combustion takes place between the supply fuel and a partial amount of the total oxygen supply to the combustion chamber with the production of very high temperatures. In order to protect the inside flame chamber against the extreme temperatures of the stoichiometric combustion process and an additional partial amount of oxygen is injected into the free annulus between the combustion chamber housing and the flame chambers supported within the housing by means of straps or other supports. This additional oxygen is made to react with a catalytically produced fuel and the reaction takes place at a relatively low combustion chamber temperatures. Due to this outer gas jacket of relatively low temperatures not only the flame chamber is cooled from the outside but the inside of the following thrust nozzle is also protected from the hot flame core by fog cooling. This fog cooling is fed to the thrust nozzle directly from the flame chamber extending up to the thrust nozzle. In the known rocket engines with double combustion chambers there is practically two single combustion chambers arranged coaxially one inside the other and a temperature distribution of the reacted propellant gases which are graded radially from the inside to the outside is achieved by an internal hot reaction and an external relatively cool reaction. A total of three propellant components take part in the two separate reaction processes so that on the one hand high specific impulses are achieved and on the other hand the individual wall portions of the combustion chamber are protected against overheating.

The present invention does not concern rocket engines of the above described type, it rather relates to gas generators or combustion chamber constructions for the production of oxidizer rich gases or relatively low temperature, that is, propellant gases whose radial temperature cross section is constant in order to make them suitable for driving a turbine arranged behind the combustion chamber. This requires as a heat sensitive machine with relatively low and balanced propellant gas temperatures. In such a gas generator with a great excess of oxygen carriers which has a very low combustion chamber inlet temperatures, the particular problem is to start and maintain the combustion with a relatively small amount of fuel in the entire combustion chamber for flow therethrough and a practically "combustion-hostile" environment in which there is an oxygen-rich interior of the combustion chamber.

Accordingly, it is an object of the invention to meet the above requirements and to provide a combustion chamber which is safe in respect to the reaction process and which provides an oxygen-rich propellant gas of relatively low and uniform temperature. In accordance with the invention, this is achieved by providing a plurality of annularly arranged reaction chambers or a single continuous annular reaction chamber of short overall length in comparison to the overall length of the gas generator combustion chamber itself. These reaction chambers are located on the front face of the gas generator and provides stoichiometric combustion of the entire fuel with a portion (primary oxygen carrier) of the total oxidizer fed to the combustion chamber. The various reaction chambers may be arranged side-by-side in a ring form or may comprise a single reaction chamber or ring-shaped configuration and of short overall length as compared to the gas generator housing in which it is positioned.

In accordance with a feature of the invention the individual reaction chambers and/or the single ring-shaped reaction chamber is cooled by cooling ducts which direct oxidizer along the walls thereof and which may in one embodiment comprise flow channels defined in the walls themselves or in another embodiment comprise individual admission ducts for directing the oxygen carrier against the walls. The cooling is effected by secondary oxygen which is heated during its movement in association with the reaction chamber walls and transformed into a gaseous state for the following mixing process in the combustion chamber proper. The invention solves not only the basic problem outlined above but also results in a shortening of the overall length of the gas generator since the stoichiometric reaction process is localized in the reaction chambers and the hot reaction gases have a great expansion tendency so that the mixing effect is rapidly achieved.

Accordingly, it is an object of the invention to provide an improved auxiliary combustion chamber construction particularly for rocket engines of the main current type in order to provide oxygen-rich propellant gases of relatively low temperatures which are adapted to be directed through the blades of a working turbine and which includes radially spaced annular walls defining an overall auxiliary combustion chamber inside of which adjacent the rear face thereof, there is located one or more reaction chambers of shorter length than the combustion chambers and arranged in an annular pattern; and which includes a nozzle for directing a liquid fuel into the reaction chamber for reaction with a portion of the oxygen which is directed adjacent the nozzle for cooling purposes and wherein a further portion of the oxygen is directed around the walls of the reaction chamber or chambers for preheating of the oxygen and cooling of the wall, the secondary oxygen thereafter combining with the reaction constituents which are directed out of the reaction chamber into the combustion chamber proper.

A further object of the invention is to provide a gas generator which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial axial sectional view of an auxiliary gas generator constructed in accordance with the invention;

FIG. 2 is a section taken along the line II—II of FIG. 1;

FIG. 3 is a view similar to FIG. 1 of another embodiment of the invention;

FIG. 4 is a section taken along the line IV—IV of FIG. 3; and

FIG. 5 is a partial axial sectional view of a rocket engine having an auxiliary combustion chamber therein of the type indicated in FIGS. 3 and 4.

GENERAL DESCRIPTION OF THE PREFERRED EMBODIMENTS

Referring to the drawings in particular, the invention embodied therein in FIGS. 1 and 2 comprises an auxiliary gas generator or combustion chamber generally designated 2 which is defined within an annular space 20 of a rocket engine of the main current type generally designated 1. The combustion chamber 2 in the embodiment illustrated comprises an annular or ring-shaped chamber which is formed by an outer casing wall 2a and an inner annular casing wall 2b which is closed at the inner end by an annular end face 3.

In accordance with the invention, a plurality of individual reaction chambers generally designated 4, are arranged in a circumferential direction in a ring pattern. Each reaction chamber 4 includes tubular walls 4a of shorter lengths than the casing walls 2a and 2b and which define cooling conduits 7 for secondary oxygen SK.

A liquid fuel B is fed to the gas generator 2 through a conduit 22 and discharges through an injection nozzle 5 for each of the individual reaction chambers 4. A partial amount of the oxygen or oxygen carrier SP which is to be reacted with the fuel component B is introduced through a plurality of bores 6 which are defined in the end face 3 and which are located around each nozzle 5 so that the secondary oxygen SP provides a cooling effect on the nozzles. The quantity of primary oxygen SP which is introduced through the bores 6 to the individual reaction chambers is such that a stoichiometric combustion is insured in the reaction chambers. The other part of the oxygen in the form of a secondary oxygen SK is introduced through the cooling bores 7 which extend longitudinally in the walls 4a of the reaction chambers 4. The reaction chambers 4 are thus cooled and at the same time the oxygen secondary SK is heated.

The length of the reaction chambers 4 is substantially shorter than the length of the casing walls 2a and 2b of the gas generator 2. They are made only as long as required for the stoichiometric combustion process in the reaction chamber to progress so that a sufficient mixing zone remains up to the heat sensitive turbine 8 for the combustion gases which are first produced in the reaction chambers 4 and then directed outwardly into the main combustion chamber proper 24. The combustion is such that the turbine blades 8 of a gas turbine 28, as indicated in FIG. 5, are supplied with gases to effect the rotation of the blades thereof. The combustion gases directed to the turbine 23 comprise a homogeneous oxygen rich propellant gases of relatively low temperatures.

In the embodiment illustrated in FIGS. 3, 4, and 5 the rocket engine 23 includes a casing generally designated 1' having a gas generator or combustion chamber generally designated 2' with spaced inner and outer annular walls 2a' and 2b' respectively and an end wall 3' as in the other embodiment. In this embodiment however, the interior of the combustion chamber 2' is provided with a single continuous annular reaction chamber 14 having walls 9 and 10 which are shorter than the walls 2a' and 2b'. The supply of primary oxygen SP can be effected through slots 11 surrounding the fuel nozzle 5'. The secondary oxygen SK is supplied through bores 12 and 13 in the end wall 3' and the outer wall 2b' respectively, which are directed toward the ring walls 9 and 10 in order to cool them in the exterior thereof.

As shown in FIG. 5, the rocket casing 1' includes an intermediate portion 24 for rotatably supporting a shaft 26 of the turbine 23 having turbine blades 8 which receives the gases generated in the combustion chamber 24 and is rotated thereby.

What is claimed is:

1. A main current rocket engine of a type having a precombustion chamber for burning the propellent components to produce oxidizer-rich propellent gases of relative low temperature, comprising wall means defining said precombustion chamber of annular form having a head defining a closed end and an opposite opened end for the discharge of the oxygen-rich low-temperature propelling gases, at least one tubular reaction chamber located within said precombustion chamber having inner and outer annular walls at a spaced location therefrom defining an annular reaction chamber space and having a closed end formed by the closed end of said precombustion chamber, said tubular reaction chamber being of a length substantially shorter than the length of said precombustion chamber, a liquid fuel nozzle extending into the closed end of said reaction chamber and discharging a fuel in the form of a liquid spray within said reaction chamber, at least one inlet surrounding said nozzle for supplying pure oxygen or a chemical oxidizer into said reaction chamber, and means supplying a secondary pure oxygen or chemical oxidizer into said precombustion chamber adjacent said reaction chamber for cooling said reaction chamber and the gases exiting from said reaction chamber into said precombustion chamber.

2. A main current rocket engine, according to claim 1, wherein said tubular reaction chamber inner and outer walls have a plurality of longitudinally extending cooling ducts extending therealong, said cooling ducts being connected to said means for supplying secondary oxygen.

3. A main current rocket engine, according to claim 1, wherein there are a plurality of arcuately spaced radial walls extending between said inner and outer walls at regular spaced locations to define individual tubular reaction chambers around said annular reaction chamber space arranged in side-by-side relationship.

4. A main current rocket engine, according to claim 1, wherein said wall means defining said precombustion chamber includes a plurality of openings therethrough for the inflow of primary oxygen and comprising said inlet which is located adjacent said reaction chamber.

5. A primary current rocket engine, according to claim 1, wherein said reaction chamber comprises a ring-shaped single reaction chamber extending completely around the interior of said precombustion chamber.

* * * * *